US012608810B2

(12) United States Patent　　　　(10) Patent No.:　US 12,608,810 B2
Park et al.　　　　　　　　　　　　(45) Date of Patent:　　Apr. 21, 2026

(54) METHOD OF AUTOMATIC SEGMENTATION OF MAXILLOFACIAL BONE IN CT IMAGE USING DEEP LEARNING

(71) Applicant: IMAGOWORKS INC., Seoul (KR)

(72) Inventors: Seungbin Park, Seoul (KR); Eung June Shim, Seoul (KR); Youngjun Kim, Seoul (KR)

(73) Assignee: IMAGOWORKS INC., Seoul (KR)

( * ) Notice: Subject to any disclaimer, the term of this patent is extended or adjusted under 35 U.S.C. 154(b) by 776 days.

(21) Appl. No.: 17/269,881

(22) PCT Filed: Jan. 7, 2021

(86) PCT No.: PCT/KR2021/000179

§ 371 (c)(1),
(2) Date: Sep. 7, 2023

(87) PCT Pub. No.: WO2022/145557

PCT Pub. Date: Jul. 7, 2022

(65) Prior Publication Data

US 2023/0419495 A1　　Dec. 28, 2023

(30) Foreign Application Priority Data

Dec. 30, 2020　(KR) ........................ 10-2020-0188575

(51) Int. Cl.
*G06T 7/11*　　　　(2017.01)

(52) U.S. Cl.
CPC ...... *G06T 7/11* (2017.01); *G06T 2207/10081* (2013.01); *G06T 2207/20081* (2013.01);
(Continued)

(58) Field of Classification Search
None
See application file for complete search history.

(56) References Cited

U.S. PATENT DOCUMENTS

2017/0084026 A1 *　3/2017　Kim ........................ G06T 17/10
2019/0261945 A1 *　8/2019　Funka-Lea ........... G06T 15/205
(Continued)

FOREIGN PATENT DOCUMENTS

CN　　111476859 A　*　7/2020　............. G06N 3/045
CN　　111595737 A　*　8/2020　............. G06N 3/045
(Continued)

OTHER PUBLICATIONS

"A Study on Automatic Segmentation of 3D Model of CT Facial Bone Using Deep Learning", Thesis for Master Course of Korea University Graduate School, Published on Feb. 1, 2020.
(Continued)

*Primary Examiner* — Jiangeng Sun
(74) *Attorney, Agent, or Firm* — STAAS & HALSEY LLP

(57) ABSTRACT

A method of automatic segmentation of a maxillofacial bone in a CT image using a deep learning, the method includes receiving input CT slices of the CT image including the maxillofacial bone, segmenting the input CT slices into a mandible and a portion of the maxillofacial bone excluding the mandible using a convolutional neural network structure and accumulating 2D segmentation results which are outputs of the convolutional neural network structure to reconstruct a 3D segmentation result. The convolutional neural network structure includes an encoder including a first operation and a second operation different from the first operation in a same layer and a decoder including a third operation and a fourth operation different from the third operation in a same layer.

13 Claims, 11 Drawing Sheets

⇒ conv 3×3, Leaky ReLu + Batch Normalization
⇨ conv 1×1, Leaky ReLu
⬍ max pooling 2×2
⬆ Upsampling
⇨ conv 1×1
⇒ conv 1×1, Softmax
⇢ addition
⟅⟆ copy and concatenation

(52) U.S. Cl.

CPC ............... *G06T 2207/20084* (2013.01); *G06T 2207/30036* (2013.01)

(56) References Cited

U.S. PATENT DOCUMENTS

| | | | | |
|---|---|---|---|---|
| 2019/0302290 A1 * | 10/2019 | Alwon | .................... | G01V 1/364 |
| 2019/0378274 A1 * | 12/2019 | Garnavi | ................ | G06N 3/086 |
| 2023/0306677 A1 * | 9/2023 | Kim | ........................ | G06V 10/82 |

FOREIGN PATENT DOCUMENTS

| | | | | | |
|---|---|---|---|---|---|
| CN | 111612722 A | * | 9/2020 | ............. | G06N 3/045 |
| CN | 111862261 A | * | 10/2020 | ............. | G06N 3/045 |
| CN | 115603830 A | * | 1/2023 | ............. | H04B 10/85 |
| KR | 10-2016-0060574 A | | 5/2016 | | |
| KR | 10-2016-0083788 A | | 7/2016 | | |
| KR | 10-2019-0138107 A | | 12/2019 | | |
| KR | 10-2020-0065777 A | | 6/2020 | | |
| KR | 10-2020-0112309 A | | 10/2020 | | |
| KR | 10-2020-0125135 A | | 11/2020 | | |
| KR | 10-2020-0137768 A | | 12/2020 | | |

OTHER PUBLICATIONS

B.Qiu et al, "Automatic segmentation of the mandible from computed tomography scans for 3D virtual surgical planning using the convolutional neural network", Phys. Med. Biol. 64 (2019). Sep. 5, 2019.

International Search Report issued in PCT Application No. PCT/KR2021/000179 dated Sep. 28, 2021.

Notice of Allowance issued in Korean Patent Application No. 10-2020-0188575 dated Nov. 15, 2021.

* cited by examiner

Patient CT Slices

Input
CT Slices

Proposed CNN

Output
2D Segmentation

Reconstructed
3D Segmentation

METHOD OF AUTOMATIC SEGMENTATION OF MAXILLOFACIAL BONE IN CT IMAGE USING DEEP LEARNING

CROSS-REFERENCE TO RELATED APPLICATIONS

This application is a U.S. National Stage under 35 USC 371 of PCT International Application No. PCT/KR2021/000179 filed on Jan. 7, 2021, which claims the priority benefit of Korean Patent Application No. 10-2020-0188575 filed on Dec. 30, 2020 in the Korean Intellectual Property Office (KIPO). Both the PCT International Application and the Korean Patent Application are incorporated by reference herein in their entireties.

BACKGROUND

1. Technical Field

Embodiments relate to a method of automatic segmentation of a maxillofacial bone in a computed tomography (CT) image using a deep learning and a non-transitory computer-readable storage medium having stored thereon program instructions of the method of the automatic segmentation of the maxillofacial bone in the computed CT image using the deep learning. More particularly, embodiments relate to a method of automatic segmentation of a maxillofacial bone in a CT image using a deep learning automatically segmenting a mandible and a portion of a maxillofacial bone excluding the mandible in the CT image including the maxillofacial bone and a non-transitory computer-readable storage medium having stored thereon program instructions of the method of the automatic segmentation of the maxillofacial bone in the computed CT image using the deep learning.

2. Description of the Related Art

In a computed tomography (CT) image or in a cone beam computed tomography (CBCT) image (hereinafter, CT and CBCT are referred to as CT) for a head and neck, a maxillofacial bone may be segmented into a maxilla and a mandible to generate 3D models for diagnosis and treatment planning such as oral maxillofacial deformity, cancer resection, mandible reconstruction and so on. In addition, segmentation of OAR (organs at risk) including the mandible may be a first step necessary in planning a radiation therapy for a head and neck cancer.

Generally, the segmentation of the maxillofacial bone may be operated manually. This is a very time consuming and tedious task in actual clinical practice. Furthermore, a precise segmentation of the head and neck CT image is a difficult task due to a complexity of the anatomy, a noise by dental prosthesis (FIG. 1), a difficulty of distinguishing between maxillary teeth and mandibular teeth (FIG. 2), weak edges of condyles (FIG. 3), a low contrast of soft tissue, a variety of mandibular bone between patients (FIG. 4) and a variety of maxillary bone between patients (FIG. 5). In addition, the manual segmentation has a limit since the manual segmentation may have low recall and the result of the segmentation may vary depending on operating persons.

The mandible is a bone of a lower jaw. The mandible is the largest in the maxillofacial bone, strong and having a high complexity. The mandible includes the mandibular teeth, blood vessels and nerve bundles. Studies on segmenting the mandible in the CT image have been attempted.

Most of conventional approaches for the mandibular segmentation are based on 'Atlas-based' method or 'Model-based' method. In the 'Atlas-based' method, the atlas may be generated as a result of the manual segmentation and a new image may be segmented using a registration method. The Atlas may be a reference image generated from one or more images to use prior knowledge of an object for segmentation. The Atlas may include 'deterministic atlas' generated from a single object and 'statistical atlas' statistically generated from multiple objects.

Although the 'Atlas-based' method is famous and widely used for organ segmentation in the body, the 'Atlas-based' method may have a limitation in that the 'Atlas-based' method is sensitive to anatomical variations because it uses a fixed Atlas. In addition, performing one registration operation is computationally expensive and takes a lot of time. When the 'Multi-atlas' is used, the anatomical variation problem may be reduced but an operation efficiency may be decreased.

The 'Model-based' method may include an initialization step and an optimization step. In the 'Model-based' method, the 'Statistical model' or a 'Deformable model' may be widely used. A 'Statistical shape model' or a 'Statistical appearance model' learns variation features of 'Shape' or 'Appearance' of a target structure from several training images at a training stage. The 'Statistical shape model' or the 'Statistical appearance model' is adjusted corresponding to an object for the segmentation. However, in the 'Model-based' method using the 'Statistical model', the 'Shape' or the 'Appearance' represented by the 'Statistical model' may be generally specified so that the 'Model-based' method has a low flexibility and requires a lot of training data.

In addition, the 'Deformable model' may include a deformable surface or a curve so that the 'Deformable model' may be deformed by an internal force or an external force. Herein, the external force is the force which tries to match the characteristics of the object for the segmentation. The internal force is a force of smoothing. Representatively, the 'Deformable model' may include 'Parametric deformable model' and 'Geometric deformable model'. However, when the 'Deformable model' is used and the difference between a shape of an initial model and a shape of the object is very large, a very large deformation may be applied to the model. In addition, when the 'Deformable model' is used, a topology change such as separating the models or combining models may be difficult.

SUMMARY

Embodiments provide a method of automatic segmentation of a maxillofacial bone in a CT image using a deep learning automatically segmenting a mandible and a portion of a maxillofacial bone excluding the mandible in the CT image including the maxillofacial bone.

Embodiments provide a non-transitory computer-readable storage medium having stored thereon program instructions of the method of the automatic segmentation of the maxillofacial bone in the CT image using the deep learning.

In an example method of automatic segmentation of a maxillofacial bone in a CT image using a deep learning according to the present inventive concept, the method includes receiving input CT slices of the CT image including the maxillofacial bone, segmenting the input CT slices into a mandible and a portion of the maxillofacial bone excluding the mandible using a convolutional neural network structure and accumulating 2D segmentation results which are outputs of the convolutional neural network structure to reconstruct a 3D segmentation result. The convolutional neural network structure includes an encoder including a first operation and a second operation different from the first operation in a same layer and a decoder including a third operation and a fourth operation different from the third operation in a same layer.

In an embodiment, the input CT slices may include a target slice, an upper slice immediately adjacent to the target slice and a lower slice immediately adjacent to the target slice.

In an embodiment, the 2D segmentation result may include three channels, the channel having a size same as a size of the target slice.

In an embodiment, the 2D segmentation result may include a first class representing an empty space, a second class representing the portion of the maxillofacial bone excluding the mandible and a third class representing the mandible.

In an embodiment, the first operation may be "3*3 convolutional operation+Leaky ReLu+Batch normalization" and the second operation may be "1*1 convolutional operation+Leaky ReLu".

In an embodiment, the third operation may be "1*1 convolutional operation" and the second operation may be "3*3 convolutional operation+Leaky ReLu+Batch normalization".

In an embodiment, a layer of the encoder may include a plurality of the first operations and the one second operation. The first operation may be performed before the second operation in the layer of the encoder.

In an embodiment, a layer of the decoder may include the one third operation and a plurality of the fourth operations. The third operation may be performed before the fourth operation in the layer of the decoder.

In an embodiment, the encoder may include a first skip connection adding a previous feature map to a present feature map in a same layer of the encoder. A size of an input of a convolutional operation immediately after the first skip connection of the encoder may be same as a size of an output of the convolutional operation immediately after the first skip connection of the encoder. A number of channels of the output of the convolutional operation immediately after the first skip connection of the encoder may be twice a number of channels of the input of the convolutional operation immediately after the first skip connection of the encoder.

In an embodiment, the decoder may include a second skip connection adding a previous feature map to a present feature map in a same layer of the decoder. An upscaling operation transmitting a feature map to an upper layer may be performed immediately after the second skip connection of the decoder.

In an embodiment, the decoder may operate a concatenate operation concatenating feature map received from the same layer of the encoder and an upscaled feature map generated by the upscaling operation immediately after the upscaling operation.

In an embodiment, a size of an input of a convolutional operation immediately after the concatenate operation of the decoder may be same as a size of an output of the convolutional operation immediately after the concatenate operation of the decoder. A number of channels of the output of the convolutional operation immediately after the concatenate operation of the decoder may be half of a number of channels of the input of the convolutional operation immediately after the concatenate operation of the decoder.

In an embodiment, a loss function of the convolutional neural network structure may be $$\text{Loss} = 1 - \frac{2\sum_{l=1}^{3}\sum_{n=1}^{N}p_{l,n}g_{l,n}}{\sum_{l=1}^{3}\sum_{n=1}^{N}p_{l,n}^2 + \sum_{l=1}^{3}\sum_{n=1}^{N}g_{l,n}^2}.$$

$N$ may be a number of pixels in one batch. $p_{l,n}$ is may be a probability map of class 1. $g_{l,n}$ may be a pixel value of a ground truth.

In an example non-transitory computer-readable storage medium having stored thereon program instructions, the program instructions is executable by at least one hardware processor to receive input CT slices of a CT image including a maxillofacial bone, segment the input CT slices into a mandible and a portion of the maxillofacial bone excluding the mandible using a convolutional neural network structure, the convolutional neural network structure including an encoder including a first operation and a second operation different from the first operation in a same layer and a decoder including a third operation and a fourth operation different from the third operation in a same layer and accumulate 2D segmentation results which are outputs of the convolutional neural network structure to reconstruct a 3D segmentation result.

According to the method of the automatic segmentation of the maxillofacial bone in the CT image using the deep learning, the mandible and a portion of the maxillofacial bone excluding the mandible may be automatically segmented in the CT image including the maxillofacial bone. Thus, the method of the automatic segmentation of the maxillofacial bone may greatly help a doctor's segmentation work between the mandible and maxilla.

BRIEF DESCRIPTION OF THE DRAWINGS

The above and other features and advantages of the present inventive concept will become more apparent by describing in detailed embodiments thereof with reference to the accompanying drawings, in which:

FIG. 7 illustrates a structure of a convolutional neural network of FIG. 6;

FIG. 9A illustrates a result of a mandible of the automatic segmentation of the maxillofacial bone in the CT image according to an embodiment of the present inventive concept;

DETAILED DESCRIPTION OF THE EMBODIMENTS

Figure 1:
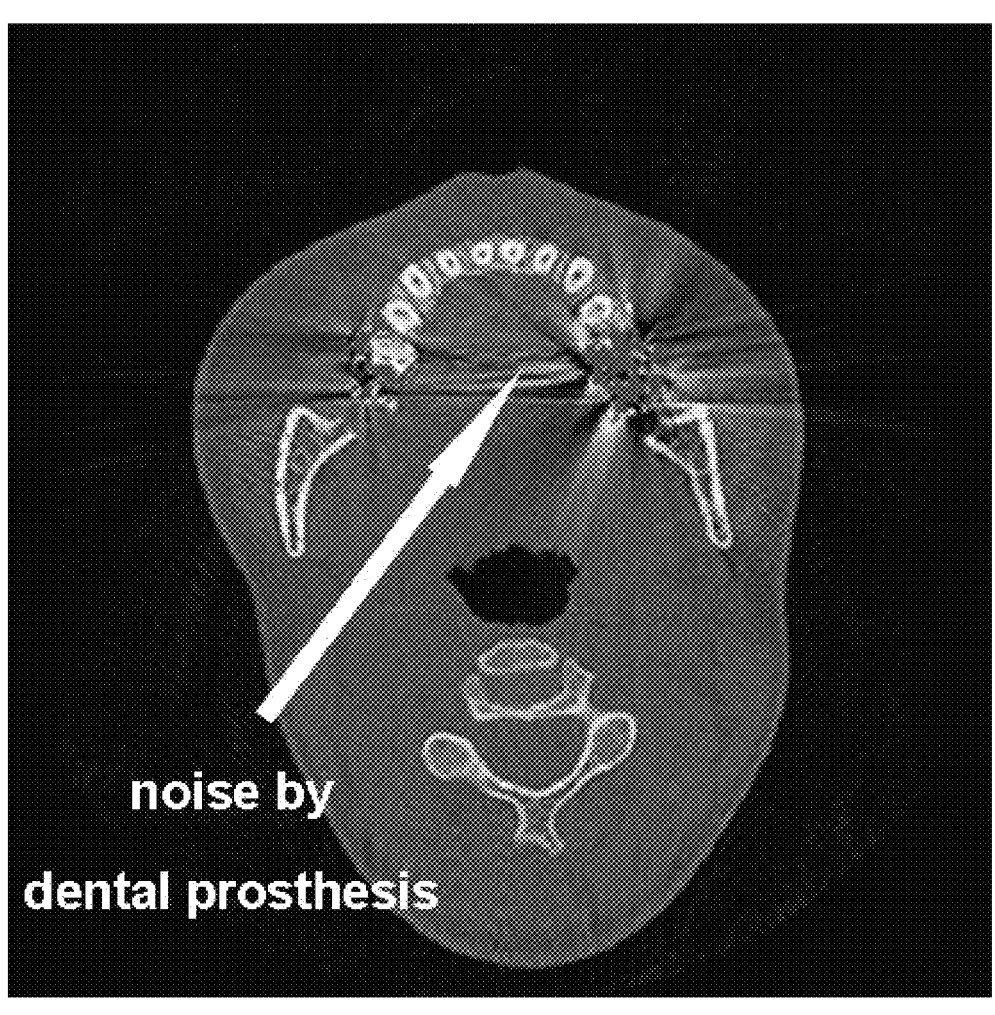
FIG. 1 illustrates a noise by dental prosthesis among reasons difficult to segment a maxillofacial bone in a CT image.
Figure 2:
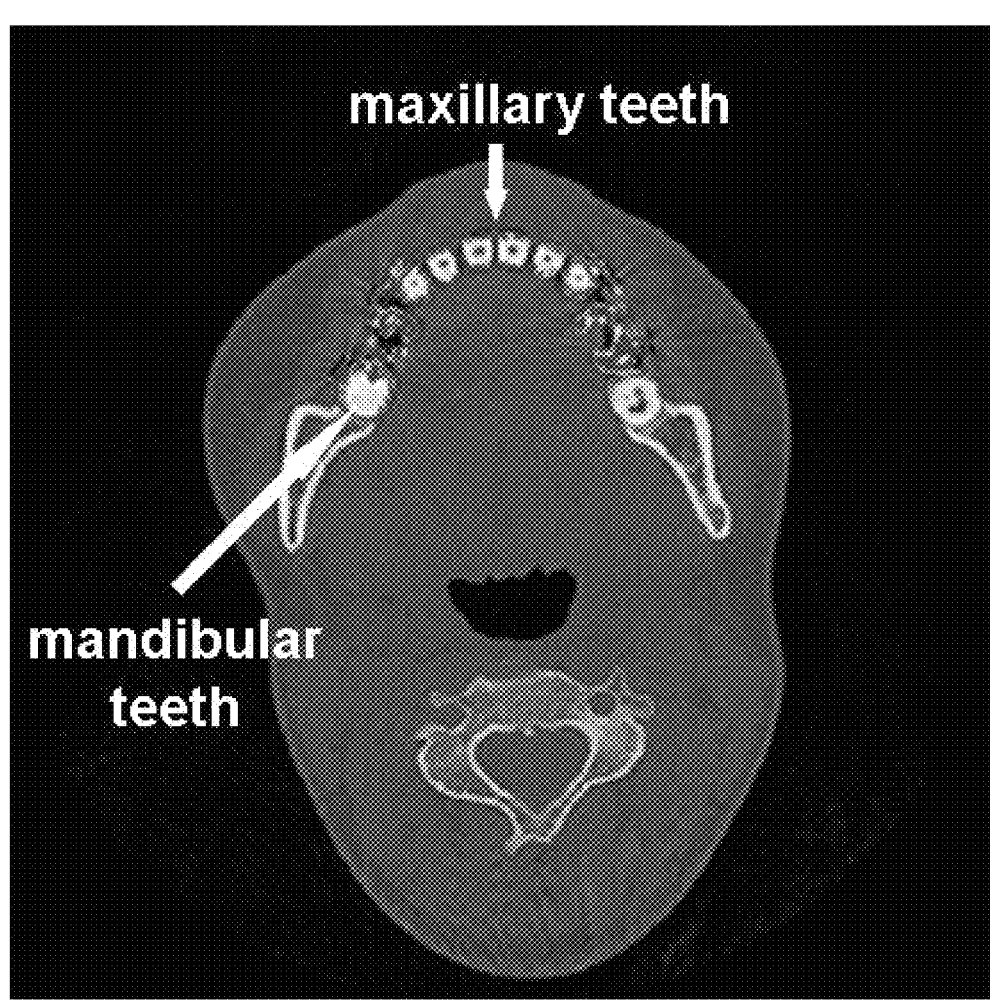
FIG. 2 illustrates a difficulty of distinguishing between maxillary teeth and mandibular teeth among the reasons difficult to segment the maxillofacial bone in the CT image.
Figure 3:
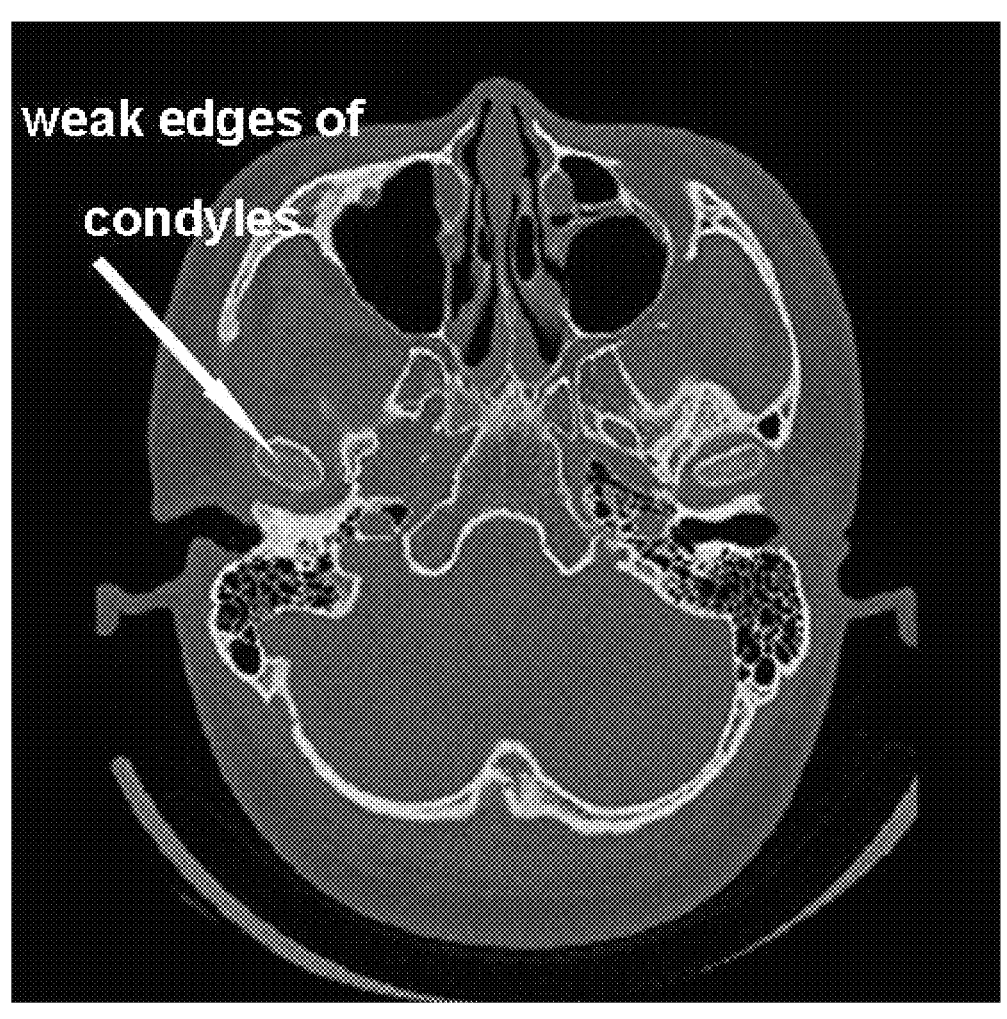
FIG. 3 illustrates weak edges of condyles among the reasons difficult to segment the maxillofacial bone in the CT image.
Figure 4:
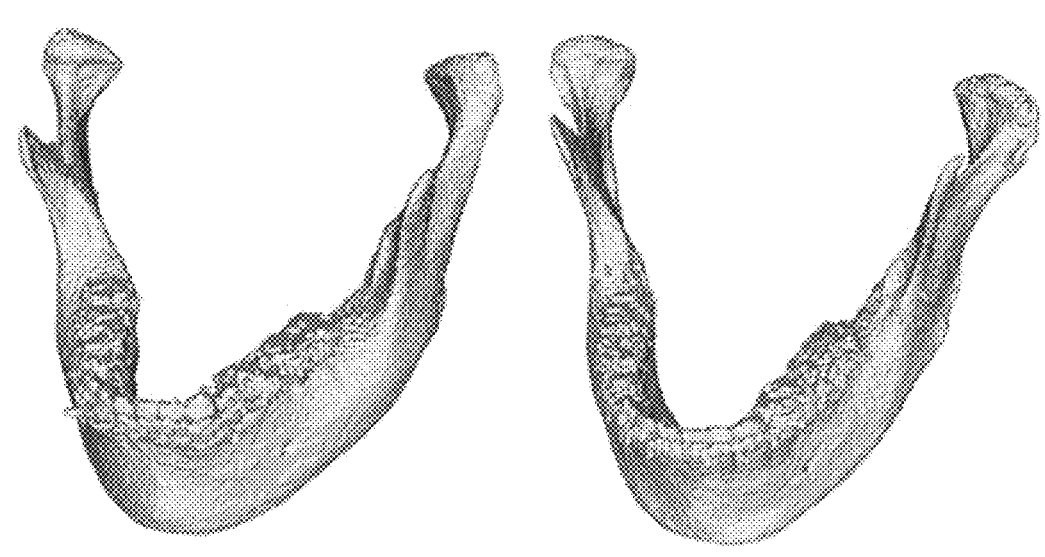
FIG. 4 illustrates a variety of mandibular bone between patients among the reasons difficult to segment the maxillofacial bone in the CT image.
Figure 5:
FIG. 5 illustrates a variety of maxillary bone between patients among the reasons difficult to segment the maxillofacial bone in the CT image.

The present inventive concept now will be described more fully hereinafter with reference to the accompanying drawings, in which exemplary embodiments of the present invention are shown. The present inventive concept may, however, be embodied in many different forms and should not be construed as limited to the exemplary embodiments set fourth herein.

Rather, these exemplary embodiments are provided so that this disclosure will be thorough and complete, and will fully convey the scope of the present invention to those skilled in the art. Like reference numerals refer to like elements throughout.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular exemplary embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the inventive concept as used herein.

Hereinafter, the present inventive concept will be explained in detail with reference to the accompanying drawings.

Figure 6:
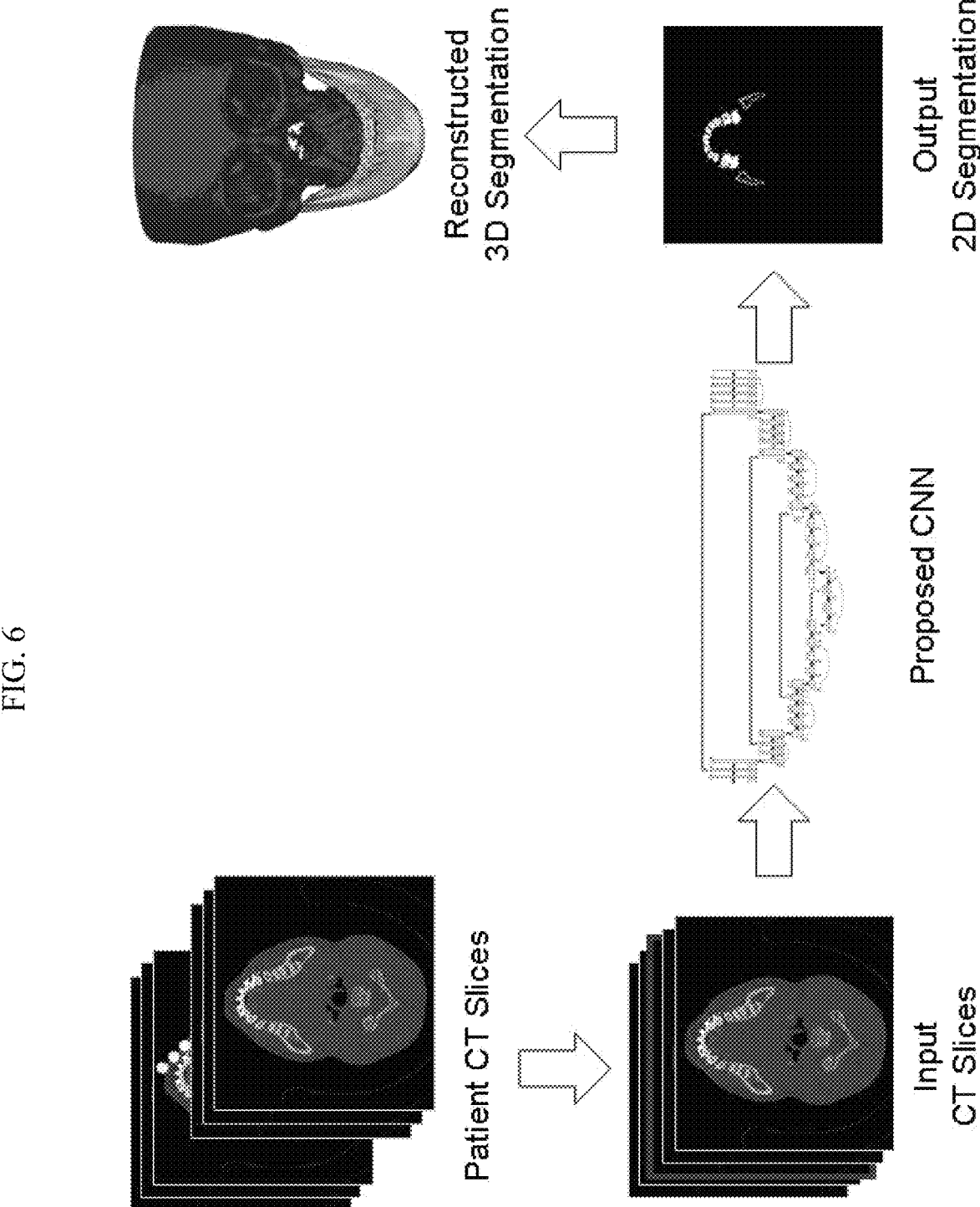
FIG. 6 illustrates a method of automatic segmentation of a maxillofacial bone in the CT image according to an embodiment of the present inventive concept.
Figure 7:
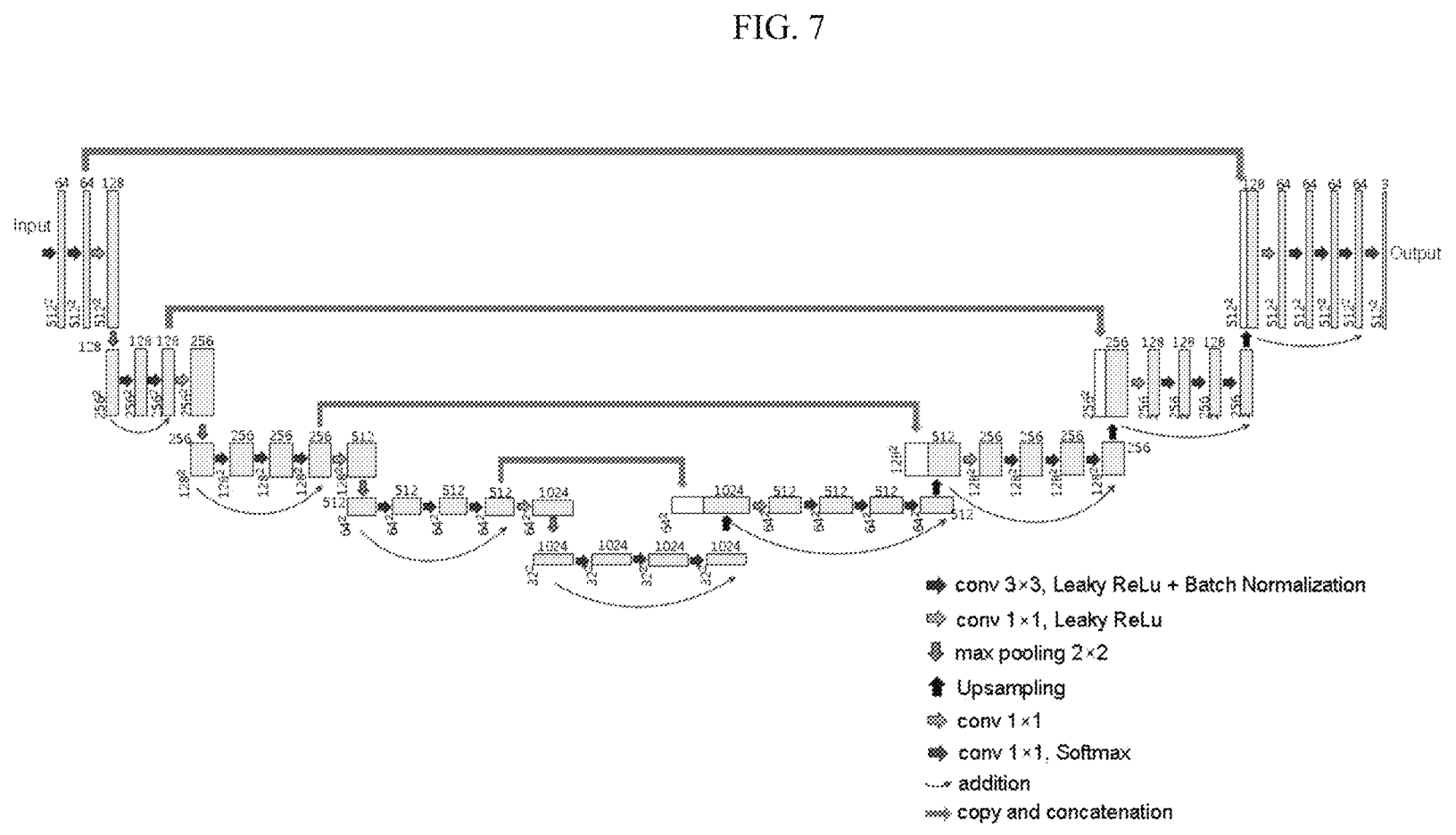

FIG. 6 illustrates a method of automatic segmentation of a maxillofacial bone in the CT image according to an embodiment of the present inventive concept. FIG. 7 illustrates a convolutional neural network structure of FIG. 6.

Referring to FIGS. 6 and 7, the method of the automatic segmentation of the maxillofacial bone in the CT image may automatically segment a mandible and a portion of the maxillofacial bone excluding the mandible using a deep learning.

A convolutional neural network (CNN) was first proposed to combine the 'Multi layer perceptron' algorithm and the 'Backpropagation' algorithm with the 'Convolution' operation. The convolutional neural network may be utilized in a field of a computer vision. The convolutional neural network may receive an image in an original 2D format and sequentially operating the 'convolution' operation on parts of the image using a filter of a specific size to extract a feature of the image.

As shown in FIG. 7, the convolutional neural network structure according to the present embodiment may include an encoder-decoder structure including 'Contracting path' which extracts the features from the input and 'Expanding path' which expands a size of the feature again. The convolutional neural network structure according to the present embodiment may add 'Localization' information reduced in a pooling process by concatenating the feature of the 'Contracting path' to the 'Expanding path' to enhance a performance. In the convolutional neural network structure according to the present embodiment, a class discrimination may be possible in a unit of a pixel.

The convolutional neural network structure according to the present embodiment may include a skip connection to prevent an information loss from deeper model operation. The skip connection is a structure which adds the feature of a previous operation to a present operation and uses the result as an input for a next operation. The skip connection may be implemented only by adding an addition operation so that additional complex operations may not be required and the number of parameters to be trained may not be increased.

FIG. 6 illustrates a framework to operate the automatic 3D segmentation of the maxillofacial bone in the CT image. An input of the convolutional neural network structure according to the present embodiment may be five consecutive 2D CT slices. The input may include one target slice, an upper slice immediately adjacent to the target slice and a lower slice immediately adjacent to the target slice. For example, the input may include one target slice, two upper slices immediately adjacent to the target slice and two lower slices immediately adjacent to the target slice. In this method, similarity and connectivity of the adjacent slices may be utilized. In the same way, multiple 2D segments for one patient may be reconstructed and the largest 'Connected component' may be extracted to generate a 3D segment.

The network structure of the present embodiment may be an encoder-decoder structure including 34 convolution operations. Most convolutional operations have a kernel size of 3*3, have an activation function of 'Leaky ReLu' and include 'Batch normalization'. The convolutional operation using 1*1 kernel and Leaky ReLu activation function is used to expand the size of a feature map in a Z-axis direction.

In the encoding process, the feature map is extracted by the convolutional operations and downsampled by 'Max pooling'. In the decoding process, several feature maps extracted in the encoding process are copied and concatenated before the convolution operations to supplement localization information which is lost in the downsampling operation. A size of the feature map may be increased by an upsampling operation using 'bilinear resizing'. In the network structure of the present embodiment, some previous feature maps are added to later feature maps to transmit information lost in deeper layers using the 'skip connection'. A final convolutional operation prior to an output segmentation map is activated by 'Softmax function' to generate a class probabilistic map. An output map includes three channels. The three channels respectively represent a probability which the pixel is the mandible, a probability which the pixel is a portion of the maxillofacial bone excluding the mandible and a probability which the pixel is a class of an empty space.

For example, in the output 2D segmentation of FIG. 6, the empty space may be class 0, the portion of the maxillofacial bone excluding the mandible may be class 1 and the mandible may be class 2. For example, in the output 2D segmentation of FIG. 6, the pixel having the highest probability of class 0 may be displayed as black, the pixel having the highest probability of class 1 may be displayed as gray and the pixel having the highest probability of class 2 may be displayed as white.

Output 2D segmentation results may be output for the respective input CT slices and the output 2D segmentation results may be accumulated and reconstructed as a 3D segmentation result.

For example, a size of the target slice which is the input of the network structure of the present embodiment may be same as a size of the output 2D segmentation result which is the output of the network structure of the present embodiment. In FIG. 6, for example, the size of the target slice may be 512*512 and the size of the output 2D segmentation result may be 512*512. The output 2D segmentation result includes three channels of the class 0, the class 1 and the class 2. The size of the each channel may be 512*512.

In detail, a first layer of the encoder of the network structure of the present embodiment may include three convolutional operations. A first convolutional operation of the first layer of the encoder receives five input CT slices of 512*512 and generates a first feature map having 64 channels of 512*512. A second convolutional operation of the first layer of the encoder receives the first feature map and generates a second feature map having 64 channels of 512*512. A third convolutional operation of the first layer of the encoder receives the second feature map and generates a third feature map having 128 channels of 512*512.

The first convolutional operation and the second convolutional operation of the first layer of the encoder may be "3*3 convolutional operation+Leaky ReLu+Batch normalization" and the third convolutional operation of the first layer of the encoder may be "1*1 convolutional operation+Leaky ReLu".

2*2 max polling may be operated to the third feature map so that a fourth feature map having 128 channels of 256*256 may be generated. By the max pooling, the size of the feature map may be reduced but the number of the channels of the feature map may be maintained.

A second layer of the encoder may include three convolutional operations. A first convolutional operation of the second layer of the encoder receives the fourth feature map and generates a fifth feature map having 128 channels of 256*256. A second convolutional operation of the second layer of the encoder receives the fifth feature map and generates a sixth feature map having 128 channels of 256*256. By the skip connection, the fourth feature map may be added to the sixth feature map. A third convolutional operation of the second layer of the encoder receives a sum of the fourth feature map and the sixth feature map and generates a seventh feature map having 256 channels of 256*256.

The first convolutional operation and the second convolutional operation of the second layer of the encoder may be "3*3 convolutional operation+Leaky ReLu+Batch normalization" and the third convolutional operation of the second layer of the encoder may be "1*1 convolutional operation+Leaky ReLu".

As explained above, the fourth feature map which is the previous feature map is added to the sixth feature map and the sum of the fourth feature map and the sixth feature map is inputted the third convolutional operation in the second layer of the encoder so that the information lost in deeper layers may be prevented. The third convolutional operation of the second layer of the encoder may be an operation for appropriately processing the sum of the fourth feature map and the sixth feature map.

2*2 max polling may be operated to the seventh feature map so that an eighth feature map having 256 channels of 128*128 may be generated.

A third layer of the encoder may include four convolutional operations. An input and an output of a first convolutional operation of the third layer of the encoder may be the eighth feature map and a ninth feature map. An input and an output of a second convolutional operation of the third layer of the encoder may be the ninth feature map and a tenth feature map. An input and an output of a third convolutional operation of the third layer of the encoder may be the tenth feature map and an eleventh feature map. An input and an output of a fourth convolutional operation of the third layer of the encoder may be the sum of the eighth feature map and the eleventh feature map and a twelfth feature map. The eighth feature map may be added to the eleventh feature map by the skip connection and the sum of the eighth feature map and the eleventh feature map may be inputted to the fourth convolutional operation of the third layer.

2*2 max polling may be operated to the twelfth feature map so that a thirteenth feature map having 512 channels of 64*64 may be generated.

A fourth layer of the encoder may include four convolutional operations. An input and an output of a first convolutional operation of the fourth layer of the encoder may be the thirteenth feature map and a fourteenth feature map. An input and an output of a second convolutional operation of the fourth layer of the encoder may be the fourteenth feature map and a fifteenth feature map. An input and an output of a third convolutional operation of the fourth layer of the encoder may be the fifteenth feature map and a sixteenth feature map. An input and an output of a fourth convolutional operation of the fourth layer of the encoder may be a sum of the thirteenth feature map and the sixteenth feature map and a seventeenth feature map. The thirteenth feature map may be added to the sixteenth feature map by the skip connection and the sum of the thirteenth feature map and the sixteenth feature map may be inputted to the fourth convolutional operation of the fourth layer.

2*2 max polling may be operated to the seventeenth feature map so that an eighteenth feature map having 1024 channels of 32*32 may be generated.

A fifth layer of the encoder may include three convolutional operations. A first convolutional operation of the fifth layer of the encoder receives the eighteenth feature map and generates a nineteenth feature map having 1024 channels of 32*32. A second convolutional operation of the fifth layer of the encoder receives the nineteenth feature map and generates a twentieth feature map having 1024 channels of 32*32. A third convolutional operation of the fifth layer of the encoder receives the twentieth feature map and generates a twenty first feature map having 1024 channels of 32*32. By the skip connection, the eighteenth feature map may be added to the twenty first feature map.

A sum of the eighteenth feature map and the twenty first feature map may be upscaled so that the sum of the eighteenth feature map and the twenty first feature map may have 512 channels of 64*64. The sixteenth feature map having 512 channels of 64*64 inputted from the fourth layer of the encoder may be concatenated to the upscaled 512 channels of 64*64. A result of the concatenation of the sixteenth feature map having 512 channels of 64*64 to the upscaled 512 channels of 64*64 may be a twenty second feature map.

A fourth layer of the decoder may include four convolutional operations. A first convolutional operation of the fourth layer of the decoder receives the twenty second feature map having 1024 channels of 64*64 and generates a twenty third feature map having 512 channels of 64*64. A second convolutional operation of the fourth layer of the decoder receives the twenty third feature map and generates a twenty fourth feature map having 512 channels of 64*64. A third convolutional operation of the fourth layer of the decoder receives the twenty fourth feature map and generates a twenty fifth feature map having 512 channels of 64*64. A fourth convolutional operation of the fourth layer of the decoder receives the twenty fifth feature map and generates a twenty sixth feature map having 512 channels of 64*64. By the skip connection, the twenty second feature map may be added to the twenty sixth feature map.

The first convolutional operation of the fourth layer of the decoder may be "1*1 convolutional operation" and the second convolutional operation, the third convolutional operation and the fourth convolutional operation of the fourth layer of the decoder may be "3*3 convolutional operation+Leaky ReLu+Batch normalization".

As explained above, in the network structure of the present embodiment, the previous feature map may be added to the present feature map in the same layer in the encoder by the skip connection and the convolutional operation immediately after the skip connection of the encoder may be "1*1 convolutional operation+Leaky ReLu". A size of the input of the convolutional operation immediately after the skip connection of the encoder may be same as the size of the output of the convolutional operation immediately after the skip connection of the encoder. However, the number of the channels of the output of the convolutional operation immediately after the skip connection of the encoder may be twice the number of the channels of the input of the convolutional operation immediately after the skip connection of the encoder.

As explained above, in the network structure of the present embodiment, the previous feature map may be added to the present feature map in the same layer in the decoder by the skip connection and the upscaling operation transmitting the feature map to the upper layer may be performed immediately after the skip connection of the decoder.

As explained above, in the network structure of the present embodiment, the feature map received from the same layer of the encoder and the upscaled feature map may be concatenated immediately after the upscaling operation.

The convolutional operation immediately after the concatenation operation of the decoder may be "1*1 convolutional operation". A size of the input of the convolutional operation immediately after the concatenate operation of the decoder may be same as the size of the output of the convolutional operation immediately after the concatenate operation of the decoder. However, the number of the channels of the output of the convolutional operation immediately after the concatenate operation of the decoder may be half of the number of the channels of the input of the convolutional operation immediately after concatenate operation of the decoder.

The encoder of the network structure of the present embodiment may include a first operation and a second operation different from the first operation. For example, the first operation may be "3*3 convolutional operation+Leaky ReLu+Batch normalization" and the second operation may be "1*1 convolutional operation+Leaky ReLu".

The decoder of the network structure of the present embodiment may include a third operation and a fourth operation different from the third operation. For example, the third operation may be "1*1 convolutional operation" and the fourth operation may be "3*3 convolutional operation+Leaky ReLu+Batch normalization".

In the present embodiment, a loss function based on 'Dice coefficient' is used. The 'Dice coefficient' is an index used to evaluate the performance of the segmentation by measuring a degree of overlap between two objects. The loss function of the present embodiment may be minimized for the multiple class segmentation. The loss function is represented as following Equation 1.

$$\text{Loss} = 1 - \frac{2\sum_{l=1}^{3}\sum_{n=1}^{N}p_{1,n}g_{l,n}}{\sum_{l=1}^{3}\sum_{n=1}^{N}p_{l,n}^{2} + \sum_{l=1}^{3}\sum_{n=1}^{N}g_{l,n}^{2}}. \qquad \text{[Equation 1]}$$

Herein, N is a number of pixels in one batch, $p_{l,n}$ is a probability map of class 1 and $g_{l,n}$ is a pixel value of a ground truth. For optimization, the model was learned in a direction of minimizing the loss function. In the present embodiment, a learning rate may be $10^{-5}$.

Figure 8:
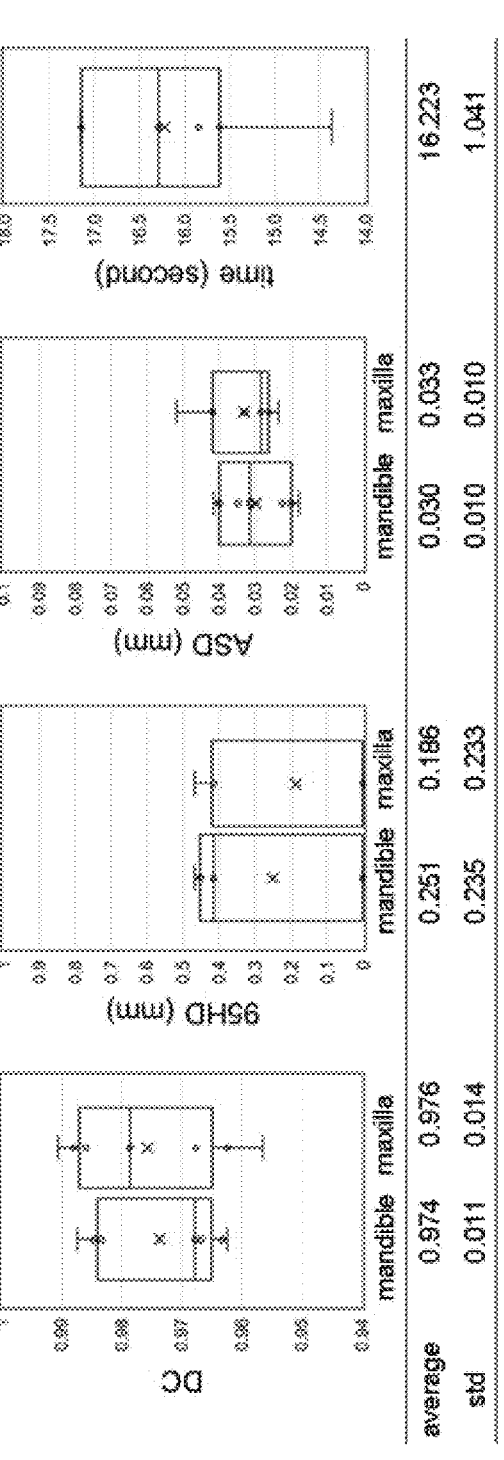
FIG. 8 illustrates a result of the automatic segmentation of the maxillofacial bone in the CT image according to an embodiment of the present inventive concept.
Figure 9A:
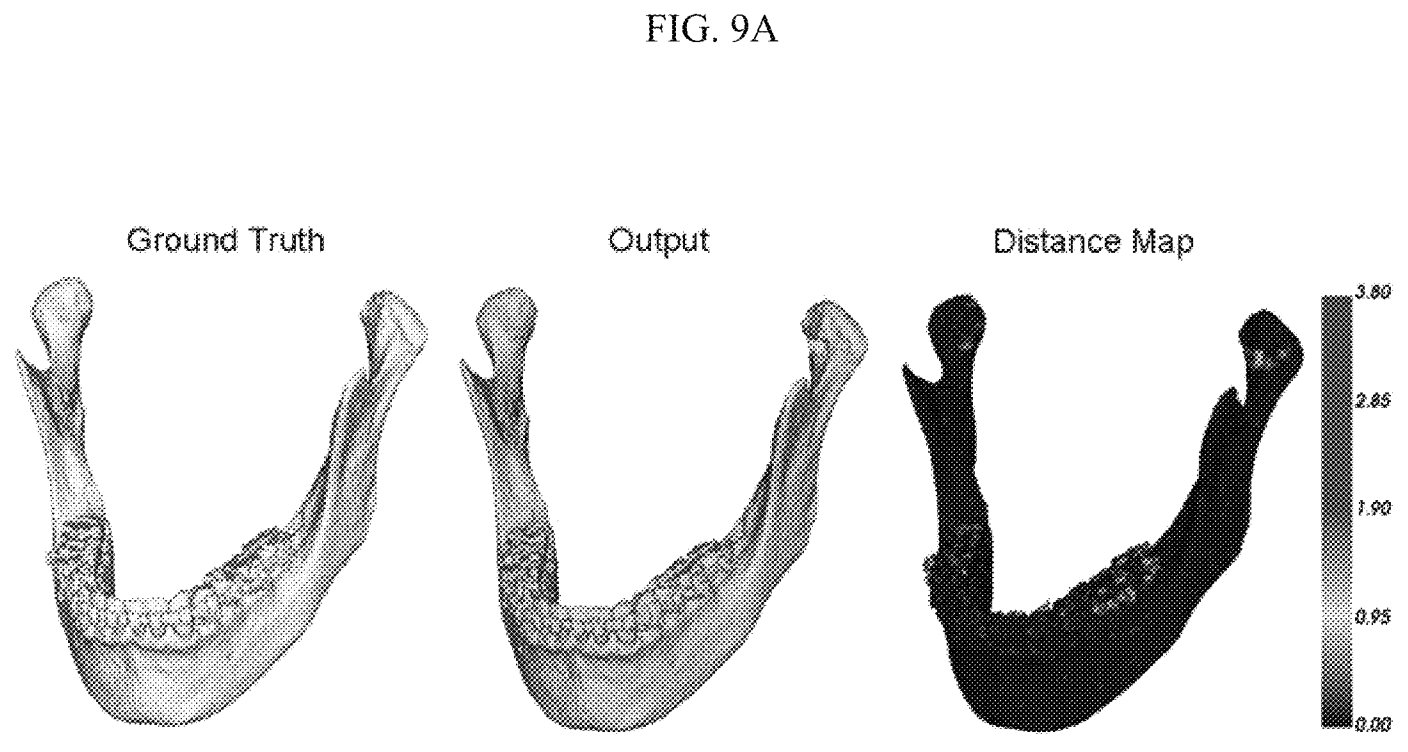
Figure 9B:
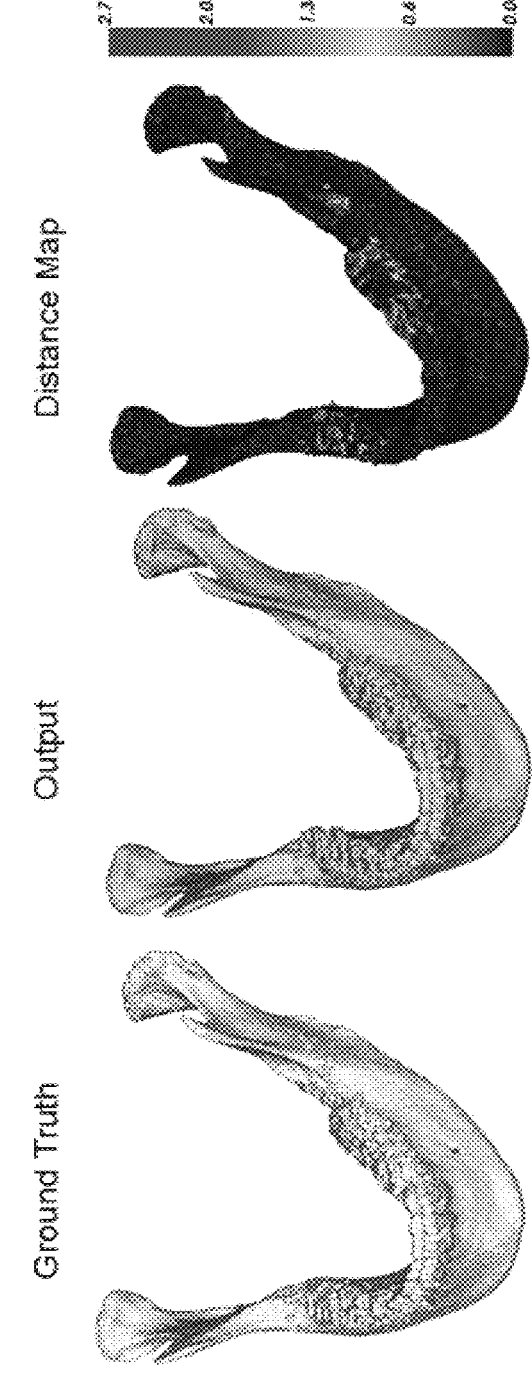
FIG. 9B illustrates a result of a mandible of the automatic segmentation of the maxillofacial bone in the CT image according to an embodiment of the present inventive concept.
Figure 10A:
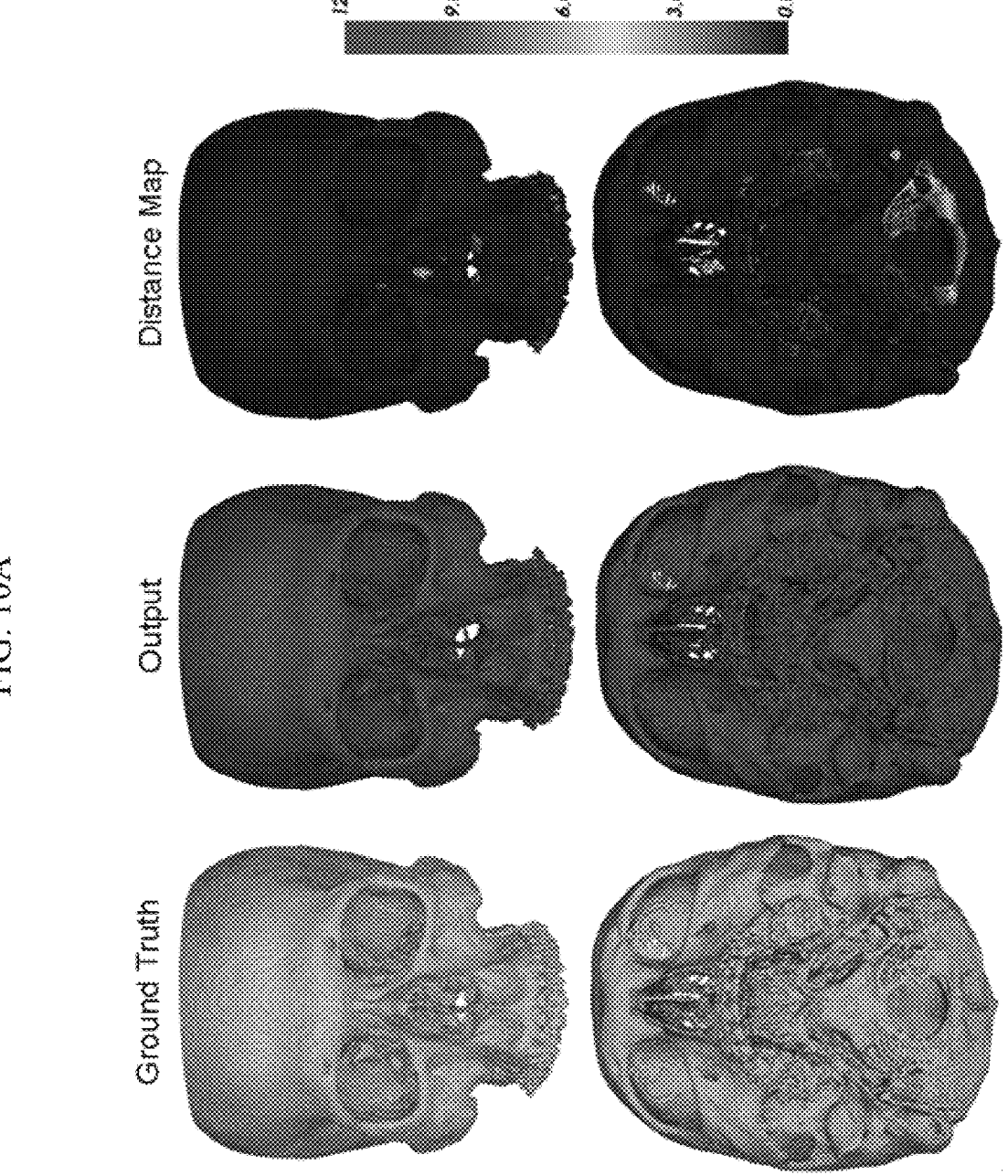
FIG. 10A illustrates a result of a portion of the maxillofacial bone excluding the mandible of the automatic segmentation of the maxillofacial bone in the CT image according to an embodiment of the present inventive concept.
Figure 10B:
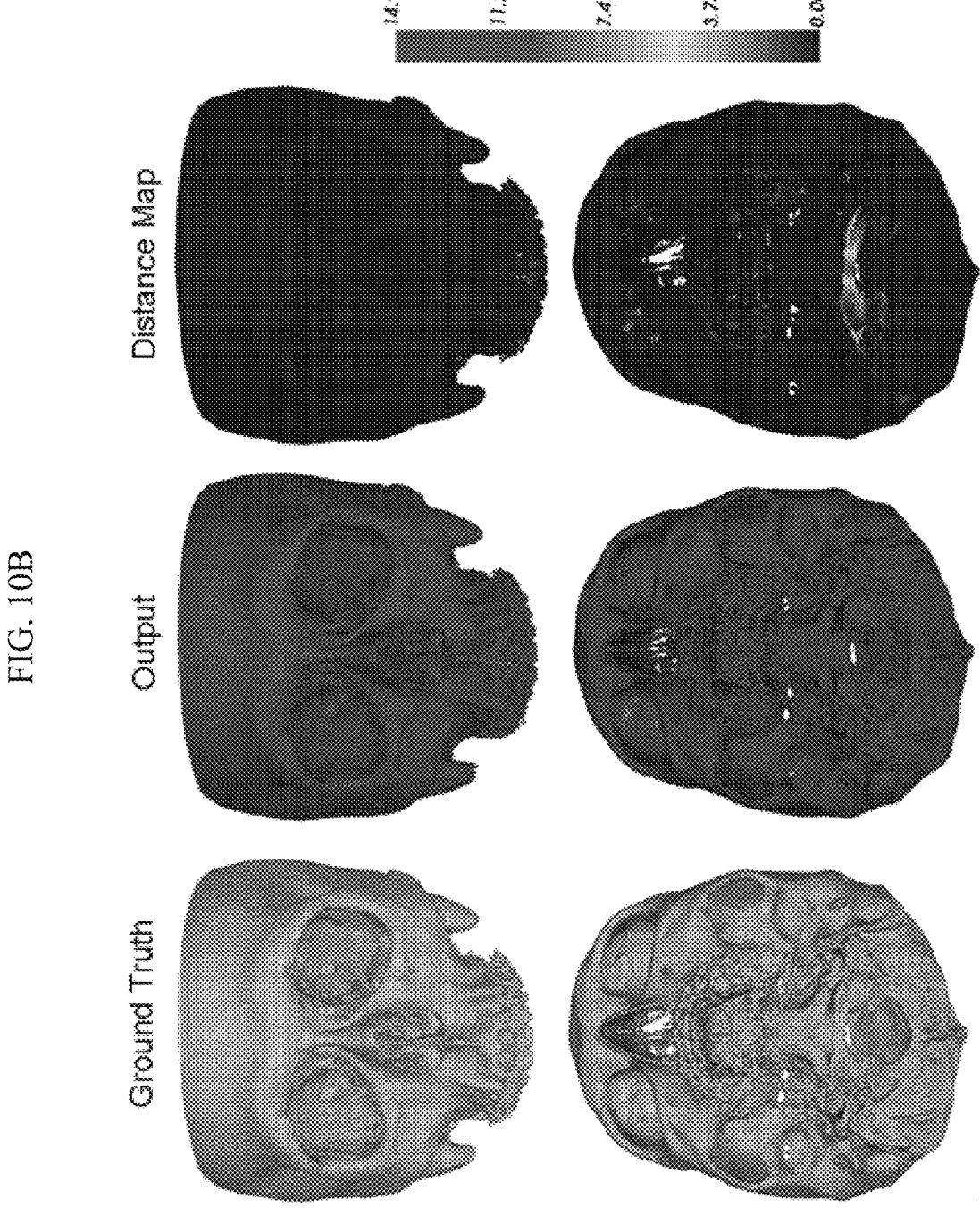
FIG. 10B illustrates a result of a portion of the maxillofacial bone excluding the mandible of the automatic segmentation of the maxillofacial bone in the CT image according to an embodiment of the present inventive concept.

FIG. 8 illustrates a result of the automatic segmentation of the maxillofacial bone in the CT image according to an embodiment of the present inventive concept. FIG. 9A illustrates a result of a mandible of the automatic segmentation of the maxillofacial bone in the CT image according to an embodiment of the present inventive concept. FIG. 9B illustrates a result of a mandible of the automatic segmentation of the maxillofacial bone in the CT image according to an embodiment of the present inventive concept. FIG. 10A illustrates a result of a portion of the maxillofacial bone excluding the mandible of the automatic segmentation of the maxillofacial bone in the CT image according to an embodiment of the present inventive concept. FIG. 10B illustrates a result of a portion of the maxillofacial bone excluding the mandible of the automatic segmentation of the maxillofacial bone in the CT image according to an embodiment of the present inventive concept.

Referring to FIGS. 6 to 10B, for the verification of the results of the present embodiment, 97 data including the CT images and manual segmentation data by experts were used.

Each CT image includes 187 to 371 slices having a size of 512*512. A range of pixel spacing is between 0.5 mm and 10 mm. A range of a thickness is between 0.36 mm and 0.49 mm. The image preprocessing may be a thresholding based on 'Hounsfield unit' of −1000 to 2500 and normalization to a value between 0 and 255.

85 data (training data) were used to train the CNN mode, 5 data (validation data during training) were used for validation during training and 7 data (performance validation data) were used for the performance validation of the final model. The validation data during training and the performance validation data are completely separated from the training data so that the validation data during training and the performance validation data were not exposed during the training.

To quantitatively validate the segmentation performance of the mode, DC (Dice coefficient), 95HD (95% Hausdorff distance) and ASD (Average surface distance) were used.

DC is an index of the degree of overlap between two objects. DC is defined as following Equation 2.

$$DC = \frac{2|GT \cap OUT|}{|GT| + |OUT|} \qquad \text{[Equation 2]}$$

Herein, GT means a ground truth of a manual segmentation and OUT means a set of classified voxels of the model output segmentation. DC may have a value between 0 (no overlap) and 1 (completely overlap). As DC is close to 1, the degree of overlap between two objects may be great.

95HD means the 95% percentage value of HD between the surface points of two objects. 95HD is defined as following Equation 3.

$$95HD(GT, OUT) = P_{95\%}(\min_{out \subseteq OUT} \|gt - out\|) \forall\, gt \subseteq GT \qquad \text{[Equation 3]}$$

Using the 95% percentage value rather than the maximum value is to reduce the effect of an outlier of the very small inaccurate segmentation in validating the overall segmentation performance.

ASD is a measured average distance between GT and OUT. ASD is defined as following Equation 4.

$$ASD = \frac{1}{2}\left\{ \frac{\sum_{out \subseteq OUT} d(out, GT)}{|OUT|} + \frac{\sum_{gt \subseteq GT} d(gt, OUT)}{|GT|} \right\} \qquad \text{[Equation 4]}$$

d (out, GT) means the minimum distance between the points of GT from a specific point 'out' of OUT. d(gt, OUT) means the minimum distance between the points of OUT from a specific point 'gt' of GT.

FIG. 8 illustrates the results of DC, 95HD and ASD between the ground truth and the model output for the 7 performance validation data and a time for the segmentation of the model.

FIG. 9A illustrates 3D rendered images of a ground truth, an output and a distance map between the ground truth and the output for a case having the highest DC among training data for the mandible. FIG. 9B illustrates 3D rendered images of a ground truth, an output and a distance map between the ground truth and the output for a case having the lowest DC among training data for the mandible. Herein, the distance map represents a distance between the ground truth and the output. In the distance map, the distance greater than 2 mm is represented as red. In the case having the highest DC, DC is 0.987, 95HD is 0 mm and ASD is 0.018 mm. In the case having the lowest DC, DC is 0.962, 95HD is 0.420 mm and ASD is 0.041 mm.

FIG. 10A illustrates 3D rendered images of a ground truth, an output and a distance map between the ground truth and the output for a case having the highest DC among training data for the portion of the maxillofacial bone excluding the mandible. FIG. 10B illustrates 3D rendered images of a ground truth, an output and a distance map between the ground truth and the output for a case having the lowest DC among training data for the portion of the maxillofacial bone excluding the mandible. Herein, the distance map represents a distance between the ground truth and the output. In the distance map, the distance greater than 10 mm is represented as red. In the case having the highest DC, DC is 0.991, 95HD is 0 mm and ASD is 0.027 mm. In the case having the lowest DC, DC is 0.957, 95HD is 0.468 mm and ASD is 0.052 mm.

In the present embodiment, the accuracy may be greatly enhanced and the time consumption may be greatly reduced compared to the conventional methods of segmenting the mandible and the portion of the maxillofacial bone excluding the mandible. In the present embodiment, only one of the maxilla and the mandible is not classified but both the maxilla and the mandible may be classified at the same time. Generally, in CT image, both the upper teeth and the lower teeth may exist in one slice. However, in the present embodiment, not only the segmentation of the teeth but also the classification of the maxilla and the mandible may be simultaneously performed so that the overall segmentation performance may be enhanced.

According to the present embodiment, the mandible and the portion of the maxillofacial bone excluding the mandible may be automatically segmented in the CT image including the maxillofacial bone. Thus, the method of the automatic segmentation of the maxillofacial bone may greatly help a doctor's segmentation work between the mandible and maxilla.

According to an embodiment of the present inventive concept, a non-transitory computer-readable storage medium having stored thereon program instructions of the method of the automatic segmentation of the maxillofacial bone in the CT image using the deep learning may be provided. The above mentioned method may be written as a program executed on the computer. The method may be implemented in a general purpose digital computer which operates the program using a computer-readable medium. In addition, the structure of the data used in the above mentioned method may be written on a computer readable medium through various means. The computer readable medium may include program instructions, data files and data structures alone or in combination. The program instructions written on the medium may be specially designed and configured for the present inventive concept, or may be generally known to a person skilled in the computer software field. For example, the computer readable medium may include a magnetic medium such as a hard disk, a floppy disk and a magnetic tape, an optical recording medium such as CD-ROM and DVD, a magneto-optical medium such as floptic disc and a hardware device specially configured to store and execute the program instructions such as ROM, RAM and a flash memory. For example, the program instructions may include a machine language codes produced by a compiler and high-level language codes which may be executed by a computer using an interpreter or the like. The hardware device may be configured to operate as one or more software modules to perform the operations of the present inventive concept.

In addition, the above mentioned method of the automatic segmentation of the maxillofacial bone in the CT image using the deep learning may be implemented in a form of a computer-executed computer program or an application which are stored in a storage method.

The present inventive concept is related to the method of automatic segmentation of the maxillofacial bone in the CT image using the deep learning and the non-transitory computer-readable storage medium having stored thereon program instructions of the method of the automatic segmentation of the maxillofacial bone in the computed CT image using the deep learning, and the mandible and the portion of the maxillofacial bone excluding the mandible in the CT image including the maxillofacial bone may be automatically segmented. Thus, the time and the effort to segment the mandible and the portion of the maxillofacial bone excluding the mandible may be greatly reduced.

The foregoing is illustrative of the present inventive concept and is not to be construed as limiting thereof. Although a few embodiments of the present inventive concept have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. In the claims, means-plus-function clauses are intended to cover the structures described herein as performing the recited function and not only structural equivalents but also equivalent structures. Therefore, it is to be understood that the foregoing is illustrative of the present inventive concept and is not to be construed as limited to the specific embodiments disclosed, and that modifications to the disclosed embodiments, as well as other embodiments, are intended to be included within the scope of the appended claims. The present inventive concept is defined by the following claims, with equivalents of the claims to be included therein.

The invention claimed is:

1. A method of automatic segmentation of a maxillofacial bone in a computed tomography (CT) image using a deep learning, the method comprising:

receiving input CT slices of the CT image including a maxillofacial bone;

segmenting the input CT slices into a mandible and a portion of the maxillofacial bone excluding the mandible using a convolutional neural network structure, the convolutional neural network structure including:

an encoder including:

a first operation; and a second operation different from the first operation in a same layer; and a decoder including:

a third operation; and a fourth operation different from the third operation in a same layer; and accumulating 2D segmentation results which are outputs of the convolutional neural network structure to reconstruct a 3D segmentation result, wherein the encoder includes a first skip connection adding a previous feature map to a present feature map in the same layer of the encoder, wherein a size of an input of a convolutional operation immediately after the first skip connection of the encoder is same as a size of an output of the convolutional operation immediately after the first skip connection of the encoder, and wherein a number of channels of the outputs of the convolutional operation immediately after the first skip connection of the encoder is twice a number of channels of inputs of the convolutional operation immediately after the first skip connection of the encoder.

2. The method of claim 1, wherein the input CT slices include a target slice, an upper slice immediately adjacent to the target slice and a lower slice immediately adjacent to the target slice.

3. The method of claim 2, wherein the 2D segmentation result includes three channels, each of the three channels having a size same as a size of the target slice.

4. The method of claim 3, wherein the 2D segmentation result includes a first class representing an empty space, a second class representing the portion of the maxillofacial bone excluding the mandible and a third class representing the mandible.

5. The method of claim 1, wherein the first operation is "3*3 convolutional operation+Leaky ReLu+Batch normalization" and the second operation is "1*1 convolutional operation+Leaky ReLu".

6. The method of claim 5, wherein the third operation is "1*1 convolutional operation" and the second operation is "3*3 convolutional operation+Leaky ReLu+Batch normalization".

7. The method of claim 5, wherein a layer of the encoder includes a plurality of the first operations and the second operation, and wherein the plurality of the first operations is performed before the second operation in the layer of the encoder.

8. The method of claim 6, wherein a layer of the decoder includes the third operation and a plurality of the fourth operations, wherein the third operation is performed before the plurality of the fourth operation in the layer of the decoder.

9. The method of claim 1, wherein the decoder includes a second skip connection adding a previous feature map to a present feature map in the same layer of the decoder, and wherein an upscaling operation transmitting a feature map to an upper layer is performed immediately after the second skip connection of the decoder.

10. The method of claim 9, wherein the decoder operates a concatenate operation a concatenating feature map received from the same layer of the encoder and an upscaled feature map generated by the upscaling operation immediately after the upscaling operation.

11. The method of claim 10, wherein a size of an input of a convolutional operation immediately after the concatenate operation of the decoder is same as a size of an output of the convolutional operation immediately after the concatenate operation of the decoder, and wherein a number of channels of the output of the convolutional operation immediately after the concatenate operation of the decoder is half of a number of channels of the input of the convolutional operation immediately after the concatenate operation of the decoder.

12. The method of claim 1, wherein a loss function of the convolutional neural network structure is $$\text{Loss} = 1 - \frac{2\sum_{l=1}^{3}\sum_{n=1}^{N}p_{1,n}g_{l,n}}{\sum_{l=1}^{3}\sum_{n=1}^{N}p_{l,n}^2 + \sum_{l=1}^{3}\sum_{n=1}^{N}g_{l,n}^2},$$

and wherein N is a number of pixels in one batch, $p_{l,n}$ is a probability map of class 1 and $g_{l,n}$ is a pixel value of a ground truth.

13. A non-transitory computer-readable storage medium having stored thereon program instructions, the program instructions executable by at least one hardware processor to:

receive input CT slices of a CT image including a maxillofacial bone;

segment the input CT slices into a mandible and a portion of the maxillofacial bone excluding the mandible using a convolutional neural network structure, the convolutional neural network structure including an encoder including a first operation and a second operation different from the first operation in a same layer and a decoder including a third operation and a fourth operation different from the third operation in a same layer; and accumulate 2D segmentation results which are outputs of the convolutional neural network structure to reconstruct a 3D segmentation result, wherein the encoder includes a first skip connection adding a previous feature map to a present feature map in the same layer of the encoder, wherein a size of an input of a convolutional operation immediately after the first skip connection of the encoder is same as a size of an output of the convolutional operation immediately after the first skip connection of the encoder, and wherein a number of channels of the outputs of the convolutional operation immediately after the first skip connection of the encoder is twice a number of channels of inputs of the convolutional operation immediately after the first skip connection of the encoder.

\* \* \* \* \*